United States Patent
Park

(10) Patent No.: US 9,899,023 B2
(45) Date of Patent: Feb. 20, 2018

(54) AUDIO VIDEO NAVIGATION DEVICE, VEHICLE AND METHOD FOR CONTROLLING THE AUDIO VIDEO NAVIGATION DEVICE

(71) Applicant: HYUNDAI MOTOR COMPANY, Seoul (KR)

(72) Inventor: Jaeseok Park, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/671,990

(22) Filed: Mar. 27, 2015

(65) Prior Publication Data

US 2016/0111088 A1 Apr. 21, 2016

(30) Foreign Application Priority Data

Oct. 17, 2014 (KR) .................. 10-2014-0140736

(51) Int. Cl.
| | |
|---|---|
| *G10L 21/00* | (2013.01) |
| *G10L 15/22* | (2006.01) |
| *G10L 15/26* | (2006.01) |
| *G01C 21/36* | (2006.01) |
| *G06F 9/44* | (2018.01) |
| *G10L 15/30* | (2013.01) |

(52) U.S. Cl.
CPC .......... *G10L 15/22* (2013.01); *G01C 21/3608* (2013.01); *G06F 9/4446* (2013.01); *G10L 15/265* (2013.01); *G10L 15/30* (2013.01)

(58) Field of Classification Search
CPC ....... G10L 15/22; G10L 15/30; G10L 15/265; G10L 15/063; G10L 15/065; G10L 17/005; G10L 17/02

USPC ................. 704/275, 231, 251, 270
See application file for complete search history.

(56) References Cited

U.S. PATENT DOCUMENTS

| | | | | |
|---|---|---|---|---|
| 2003/0120493 | A1* | 6/2003 | Gupta | G10L 15/063 704/270.1 |
| 2004/0006480 | A1* | 1/2004 | Ehlen | G10L 15/22 704/276 |
| 2007/0033055 | A1* | 2/2007 | Tanaka | G10L 15/22 704/275 |
| 2013/0185072 | A1* | 7/2013 | Huang | G10L 15/30 704/246 |

(Continued)

FOREIGN PATENT DOCUMENTS

| | | |
|---|---|---|
| JP | 10-171493 A | 6/1998 |
| JP | 2007-212919 A | 8/2007 |
| JP | 2010-210756 A | 9/2010 |

(Continued)

OTHER PUBLICATIONS

Korean Office Action dated Jun. 18, 2015 issued in corresponding Korean Patent Application No. 10-2014-0140736, with English translation.

*Primary Examiner* — Vu B Hang
(74) *Attorney, Agent, or Firm* — McDermott Will & Emery LLP

(57) ABSTRACT

An Audio Video Navigation (AVN) device includes a voice receiver for receiving a command from a user in a voice recognition mode; a storage for storing Help; and a controller for providing the Help for the user if the number of times a same pattern has occurred is equal to or greater than a threshold in the voice recognition mode.

18 Claims, 13 Drawing Sheets

(56) References Cited

U.S. PATENT DOCUMENTS

2014/0188803 A1\* 7/2014 James ............... G06F 17/30174
　　　　　　　　　　　　　　　　　　　707/638
2015/0199965 A1\* 7/2015 Leak ....................... G10L 15/22
　　　　　　　　　　　　　　　　　　　704/249

FOREIGN PATENT DOCUMENTS

| JP | 2012-093422 A | 5/2012 |
|---|---|---|
| KR | 10-2012-0019003 A | 3/2012 |
| KR | 10-2014-0051630 A | 5/2014 |

\* cited by examiner

FIG. 5

| VOICE RECOGNITION SERVICE | COMMAND |
|---|---|
| PHONE BOOK | "CALL <SOMEBODY>", "PREVIOUS SCREEN", "YES/NO" |
| CALL LOG | "LOOK UP ON <MONTH> <DATE>", "MY HOME", "PREVIOUS SCREEN", "YES/NO" |
| NAVIGATION | "SEARCH THE SURROUNDING AREA" "MY HOME" "<AREA OF INTEREST>", "<SHOP NAME>", "RECOMMENDED ROUTE", "MY HOME", "PREVIOUS SCREEN", "YES/NO" |
| RADIO/AUDIO | "FM", "AM", "<N>TH", "PLAY", "PREVIOUS SCREEN", "YES/NO" |

FIG. 6

| COMMAND | HELP |
|---|---|
| CALL <SOMEBODY> | "CHECK OUT WHETHER PHONE BOOK HAS BEEN UPDATED" |
| LOOK UP ON <MONTH> <DATE> | "CHECK OUT WHETHER CALL LOG HAS BEEN UPDATED" |
| RECOMMENDED ROUTE | "RETRY AFTER SETTING DESTINATION" |
| MY HOME | "RETRY AFTER SETTING MY HOME" |
| NO | "EXIT VOICE RECOGNITION MODE AND ENTER NAVIGATION MODE" |
| PREVIOUS SCREEN | |
| SYNCHRONIZE | "CHECK OUT BLUETOOTH CONNECTION" |

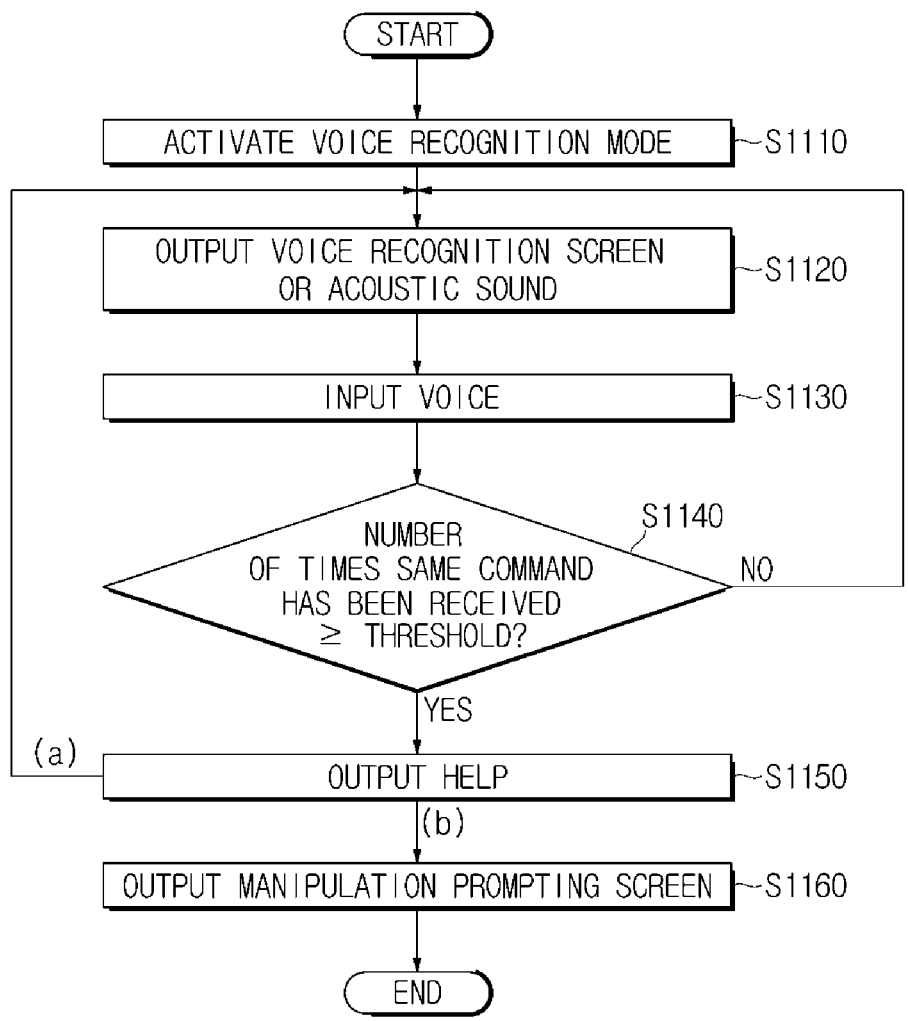

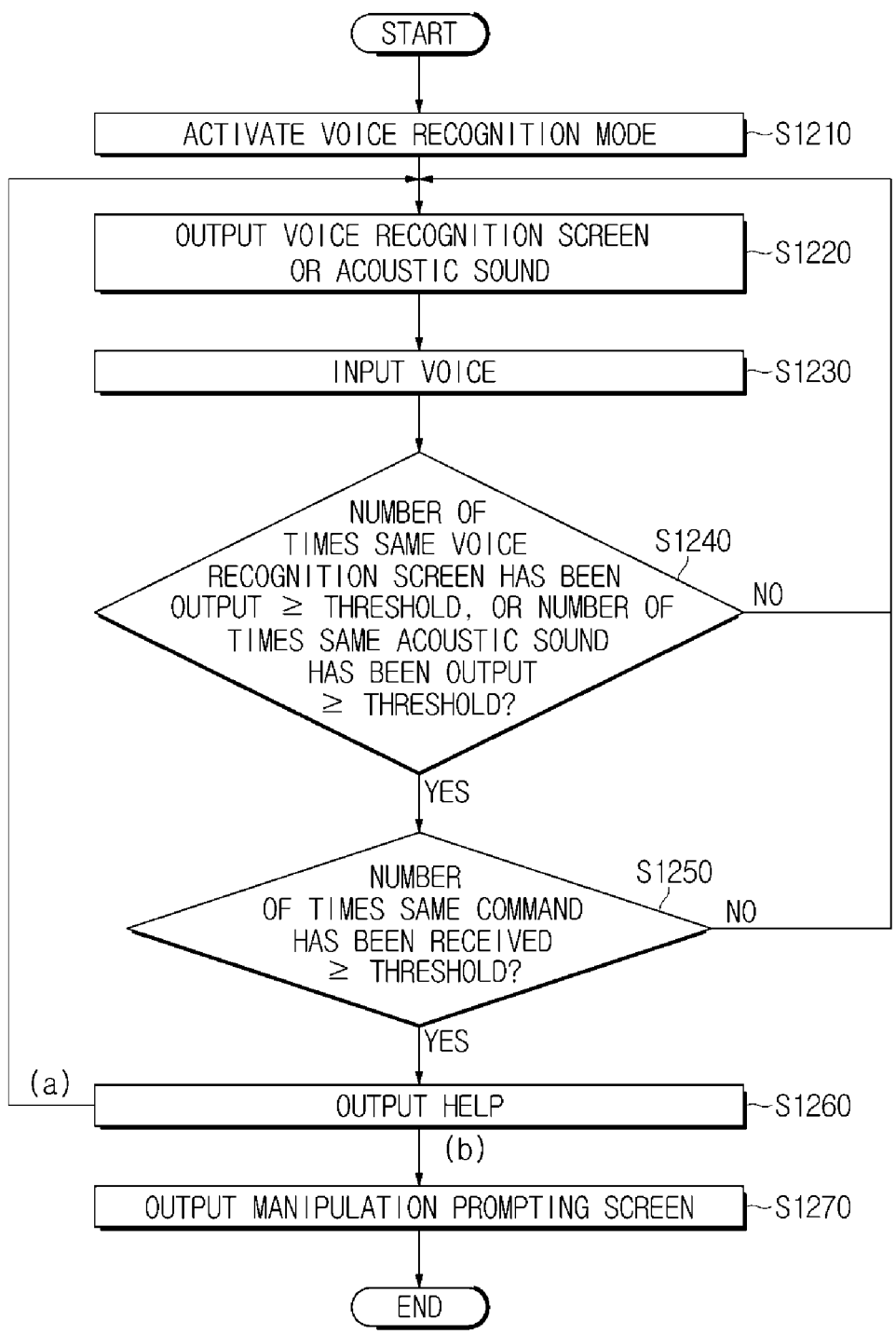

AUDIO VIDEO NAVIGATION DEVICE, VEHICLE AND METHOD FOR CONTROLLING THE AUDIO VIDEO NAVIGATION DEVICE

CROSS-REFERENCE TO RELATED APPLICATION(S)

This application claims the benefit under 35 U.S.C. § 119(a) of a Korean patent application filed on Oct. 17, 2014 in the Korean Intellectual Property Office and assigned Serial No. 10-2014-0140736, the entire disclosure of which is incorporated herein by reference.

TECHNICAL FIELD

The present disclosure relates to controlling an Audio Video Navigation (AVN) device, vehicle, and method for controlling the AVN device.

BACKGROUND

Vehicles basically run on the road but also provide various user convenient functions, such as audio play, video play, navigation, Air Conditioning (AC) and ventilation, seat control, lighting control, etc.

To perform the functions, an Audio Video Navigation (AVN) (or AVN device), a system in which an audio and multimedia device and a navigation system are integrated, is equipped in the vehicle for providing audio services including radio listening, Compact Disk (CD) playing, etc., video services including e.g., Digital Versatile Disk (DVD) playing, and navigation services for aiding in navigation.

The AVN device outputs various screens for providing radio listening services, audio services, video services, and navigation services in response to the user's manipulation. For the navigation service, the AVN device outputs various screens including a screen for finding a route to a destination, in response to the user's manipulation.

Furthermore, the AVN device may also provide voice recognition services with various voice recognition screens in response not only to the user's manipulation but also a voice command from the user.

SUMMARY

An objective of the present disclosure is to provide an Audio Video Navigation (AVN) device, vehicle, and method for controlling the AVN device, which provides Help while providing a voice recognition service.

In an aspect of the present disclosure, an Audio Video Navigation (AVN) device is provided. The AVN device includes a voice receiver for receiving a command from a user in a voice recognition mode; a storage for storing Help; and a controller for providing the Help for the user if the number of times a same pattern has occurred is equal to or greater than a threshold in the voice recognition mode.

The controller may be configured to provide the Help if the number of times a same command has been received is equal to or greater than a threshold.

The AVN device may further include a display unit for outputting a predetermined screen before the command is received.

The controller may be configured to provide the Help if the number of times the predetermined screen has been output is equal to or greater than a threshold.

The display unit may output the Help for the user, if the number of times the same pattern has occurred is equal to or greater than a threshold.

The display unit may output a manipulation prompting screen to prompt the user's manipulation after outputting the Help.

The AVN device may further include a sound unit for outputting a predetermined acoustic sound before the command is received.

The controller may be configured to provide the Help if the number of times the predetermined acoustic sound has been output is equal to or greater than a threshold.

The sound unit may output the Help for the user, if the number of times the same pattern has occurred is equal to or greater than a threshold.

The AVN device may further include a display unit for outputting a manipulation prompting screen to prompt the user's manipulation after the sound unit outputs the Help.

The AVN device may further include a communication unit for accessing another device over a network, wherein the controller may be configured to determine whether it is normally connected to the network, if the number of times the same pattern has occurred is equal to or greater than a threshold.

The controller may be configured to determine whether synchronization between the AVN device and the other device has been performed, if the number of times the same pattern has occurred is equal to or greater than a threshold.

The controller may be configured to provide Help informing the user that synchronization is required, if the synchronization has not been performed.

The controller may be configured to synchronize the AVN device with another device, if the number of times the same pattern has occurred is equal to or greater than a threshold.

The controller may be configured to enter another mode, if the number of times the same pattern has occurred is equal to or greater than a threshold.

In another aspect of the present disclosure, a vehicle is provided. The vehicle includes a voice receiver for receiving a command from a user in a voice recognition mode; a storage for storing Help; and a controller for providing the Help for the user if the number of times a same pattern has occurred is equal to or greater than a threshold in the voice recognition mode.

In another aspect of the present disclosure, a method for controlling Audio Video Navigation (AVN) device is provided. The method includes: receiving a command from a user in a voice recognition mode; determining if the number of times a same pattern has occurred is equal to or greater than a threshold in the voice recognition mode; and providing Help for the user, if the number of times the same pattern has occurred is equal to or greater than a threshold.

Determining if the number of times a same pattern has occurred is equal to or greater than a threshold in the voice recognition mode may include determining if the number of times a same command has been received is equal to or greater than a threshold.

The method may further include outputting a predetermined screen before receiving the command, wherein determining if the number of times a same pattern has occurred is equal to or greater than a threshold in the voice recognition mode may include determining if the number of times the predetermined screen has been output is equal to or greater than a threshold.

The method may further include outputting a predetermined acoustic sound before receiving the command, wherein determining if the number of times a same pattern has occurred is equal to or greater than a threshold in the voice recognition mode may include determining if the number of times the predetermined acoustic sound has been output is equal to or greater than a threshold.

Determining if the number of times a same pattern has occurred is equal to or greater than a threshold in the voice recognition mode may include determining whether it is normally connected to a network.

Other aspects, advantages, and salient features of the disclosure will become apparent to those skilled in the art from the following detailed description, which, taken in conjunction with the annexed drawings, discloses exemplary embodiments of the disclosure

BRIEF DESCRIPTION OF THE DRAWINGS

The above and other features and advantages of the present disclosure will become more apparent by describing in detail exemplary embodiments thereof with reference to the attached drawings in which:

FIG. 5 shows exemplary commands classified by the types of voice recognition service;

FIG. 6 shows exemplary help content classified by commands;

FIGS. 12 and 13 are flow charts illustrating a method for controlling an AVN device, according to embodiments of the present disclosure.

Throughout the drawings, like reference numerals will be understood to refer to like parts, components, and structures.

DETAILED DESCRIPTION

Figure 1:
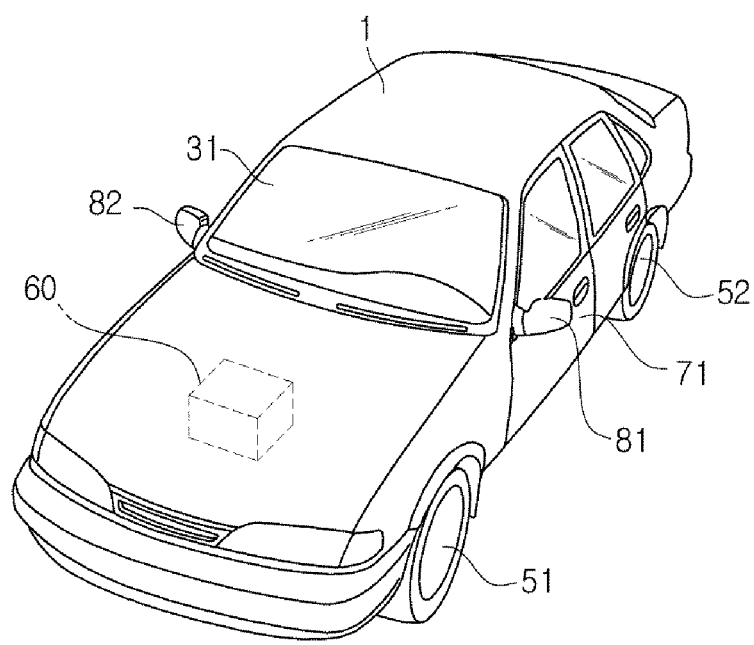
FIG. 1 shows a vehicle equipped with an Audio Video Navigation (AVN) device.

The present disclosure will now be described more fully with reference to the accompanying drawings, in which exemplary embodiments of the disclosure are shown.

The disclosure may, however, be embodied in many different forms and should not be construed as being limited to the embodiments set forth herein; rather, these embodiments are provided so that this disclosure will be thorough and complete, and will fully convey the concept of the disclosure to those skilled in the art. Like reference numerals in the drawings denote like elements, and thus their description will be omitted.

In the description of the present disclosure, if it is determined that a detailed description of commonly-used technologies or structures related to the embodiments of the present disclosure may unnecessarily obscure the subject matter of the invention, the detailed description will be omitted.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section.

Figure 2:
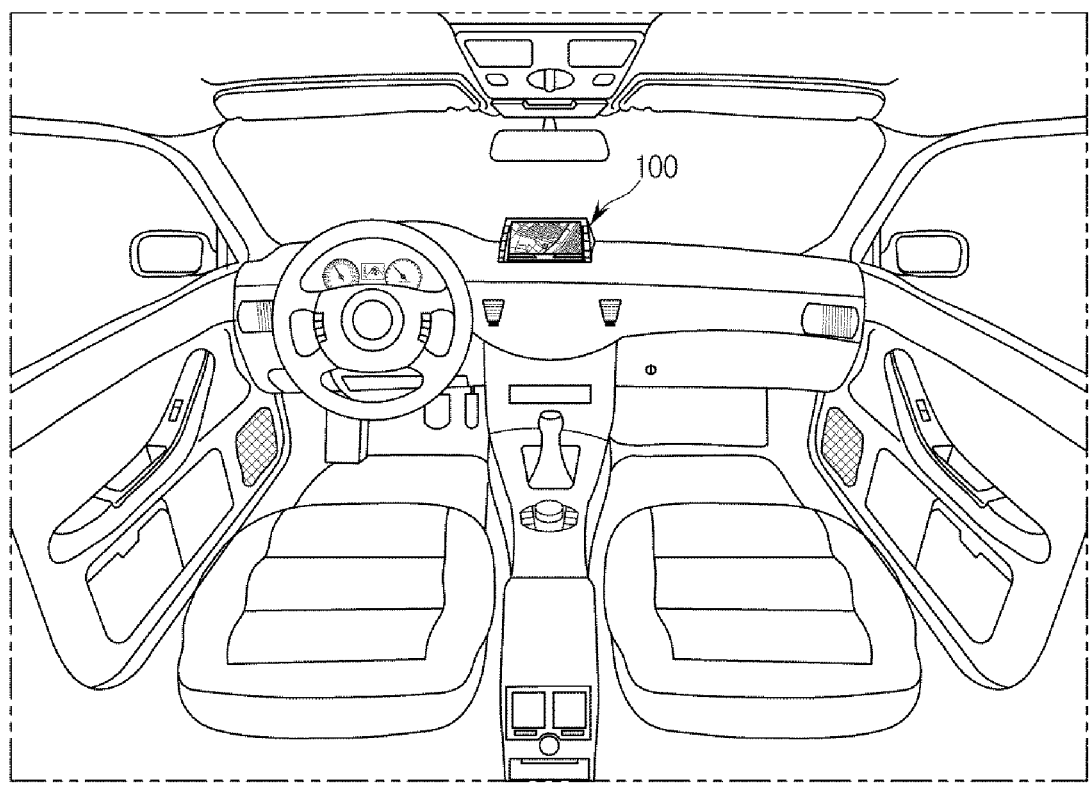
FIGS. 2 and 3 show interiors of a vehicle equipped with an AVN device.
Figure 3:
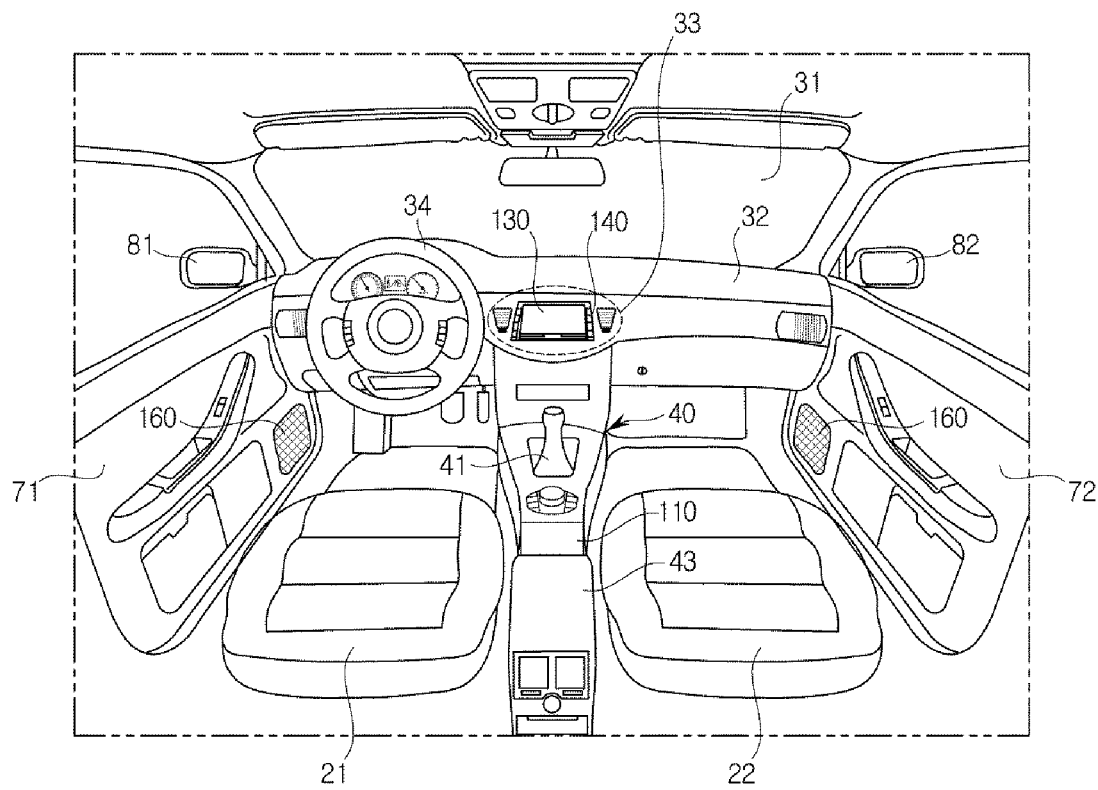

A vehicle 10 and an Audio Video Navigation (AVN) 100 (or called AVN device) will now be described with reference to FIG. 1. FIG. 1 shows an exterior of a vehicle equipped with the AVN device 100, and FIGS. 2 and 3 show the interior of a vehicle equipped with the AVN device 100.

Referring to FIG. 1, a vehicle 10 includes a main body 1, wheels 51 and 52 for moving the vehicle 10, a driving system 60 for rotating the wheels 51 and 52, doors 71 and 72 (see FIG. 3 for more information) for shielding the interior of the vehicle 10 from the outside, a windshield (or front window) 31 through which the driver can see a front view, and side mirrors 81 and 82 for helping the driver see areas behind and to the sides of the vehicle 10.

The wheels 51 and 52 include front wheels 51 and rear wheels 52, and the driving system 60 transmits turning forces to the front wheels 51 or rear wheels 52 to move the vehicle 10 forward or backward. The driving system 60 may employ a motor that produces the turning force from electrical power supplied from a storage battery (not shown) or a combustion engine (not shown) that burns a fuel to create the turning force.

The doors 71 and 72 are attached onto the left and right sides of the main body 1, and opened for entering and exiting the vehicle 10 and closed for shielding the interior of the vehicle 10 from the outside.

The windshield 31, also termed as a windshield glass, is placed on the top front side of the main body 1 for securing a front view for the driver.

The side mirrors 81 and 82 includes a left side mirror 81 and a right side mirror 82 placed on the left and right sides of the main body 1, respectively, for helping the driver obtain views behind and to the side of the vehicle 10.

In addition, the vehicle 10 may include a proximity sensor for detecting an obstruction or other cars in the back or to the side of the vehicle 10 and a rainfall sensor for detecting precipitation and whether it is raining, etc.

In an embodiment of the present disclosure, the vehicle 10 includes the AVN device 100.

The AVN device is a system in which audio and multimedia devices and a navigation system of the vehicle 10 are integrated together, for providing a radio tuning service for the driver to tune in and listen to a radio channel serviced from one of terrestrial radio stations, an audio service for playing e.g., Compact Disks (CDs), a video service for playing e.g., Digital Versatile Disks (DVDs), a navigation service for aiding the driver in navigating the way to a destination, a telephone service for controlling whether to receive an incoming call to a mobile terminal plugged into the vehicle 10, and the like. In addition, the AVN device 100 may also provide a voice recognition service for receiving voice commands other than the user's manipulation to provide the radio, audio, video, navigation, and telephone services.

Furthermore, the AVN device 100 may have e.g., a Universal Serial Bus (USB) port to be connected to a portable multimedia device such as a Portable Multimedia Player (PMP), an MPEG Audio Layer-3 (MP3) player, a Personal Digital Assistant, etc., for reproducing audio and video files.

The AVN device 100 may be movably or detachably coupled to the vehicle 10, as shown in FIG. 2, or may be fixed to the vehicle 10, as shown in FIG. 3.

The user may be served radio, audio, video, and/or navigation services through the AVN device 100.

Figure 4:
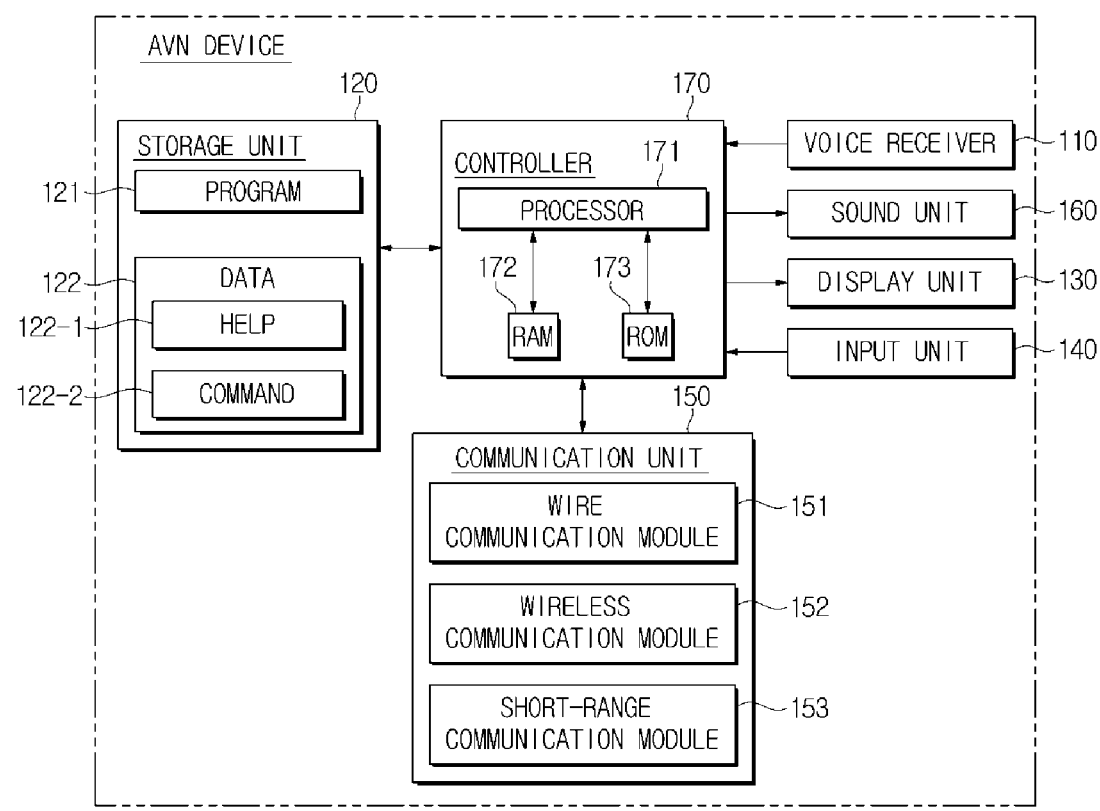
FIG. 4 is a control block diagram of an AVN device, according to an embodiment of the present disclosure.

Configuration and control of the AVN device 100 will now be described in connection with FIGS. 3 and 4. FIG. 4 is a control block diagram of the AVN device 100, according to an embodiment of the present disclosure.

Referring to FIGS. 3 and 4, the AVN device 100 includes a voice receiver 110 for receiving the user's voice; a storage 120 for storing data according to the use of the AVN device 100; a display unit 130 for displaying different screens; an input unit 140 for receiving the user's manipulation; a communication unit for accessing a network; a sound unit 160 for outputting a sound; and a controller 170 for controlling general operation of the AVN device 100.

The term 'manipulation' refers to pressing or touching a button of the input unit 140 to select an object or a tab or execute a desired item rendered on the display unit 130.

The voice receiver 110 generates an electrical signal by receiving a voice from the user. The voice may include all kinds of acoustic sounds including a human voice. The voice may be represented in sound waves with a frequency and amplitude.

The voice receiver 110 operates in a voice recognition mode.

The voice receiver 110 may be implemented with e.g., a microphone. The microphone includes a carbon microphone, a crystal microphone, a moving-coil microphone, a ribbon microphone, a condenser microphone, and/or a semiconductor microphone. However, the type of the microphone is not limited thereto and may be implemented with a different type of microphone.

The storage 120 includes a program section 121 for storing a program for functional operations of the AVN device 100 and a data section 122 for storing data generated in use of the AVN device 100. In the data section 122, Help (or help content) 122-1 related to the voice recognition service to be provided to the user and commands (122-2) required to determine the user's voice are stored.

The Help 122-1 refers to explanations or instructions for guiding the user to speak a voice command. The Help 122-1 is visually or acoustically presented to the user under control of the controller 170 if the same pattern is repeated in the voice recognition mode. The voice recognition mode will be described later in more detail in connection with FIGS. 7 to 10.

The commands 122-2 refer to data units used by the controller 170 for control operations in response to what are spoken by the user, as will be described later. The commands 122-2 may be classified by the types of voice recognition service provided in the voice recognition mode.

FIG. 5 shows exemplary commands classified by the types of voice recognition service.

Referring to FIG. 5, the voice recognition service may be classified into, for example, a phone book lookup service, a call log lookup service, a navigation service, and a radio/audio service.

The storage 120 may store commands for each voice recognition service.

Different types of voice recognition service and the corresponding commands may be stored in the storage 120 in the form of a table as shown in FIG. 5.

For example, the storage 120 may store "call <somebody>", "previous screen", "yes/no" as commands for the phone book lookup service; "look up on <month> <date>", "previous screen", "yes/no" as commands for the call log lookup service; "search the surrounding area", "my home", "<area of interest>", "<shop name>", "recommended route", "previous screen", "yes/no" as commands for the navigation service; and "FM", "AM", "<n>$^{th}$", "play", "previous screen", "yes/no" as commands for the radio/audio service.

Furthermore, the storage 120 may store Help for each command.

FIG. 6 shows exemplary help content classified by commands.

The storage 120 may store commands and the corresponding help content in the form of a table as shown in FIG. 6.

For example, the storage 120 may store "check out whether the phone book has been updated" as help content for the command "call <somebody>"; "check out whether the call log has been updated" as help content for the command "look up on <month> <date>"; "retry after setting a destination" as help content for the command "recommended route"; "retry after setting my home" as help content for the command "my home"; "exit voice recognition mode and enter navigation mode" as help content for the command "no" or "previous screen"; and "check out bluetooth connection" as help content for a command "synchronize".

The storage 120 may store various other phrases for the commands. For example, the storage 120 may store "would you call <somebody>?" as a phrase for the command "call <somebody>"; "say a command" as a phrase for the command "no" or "previous screen"; "say a shop name" as a phrase for the command "search the surrounding area"; and "these are search results for <shop name>" as a phrase for the command "<shop name>".

Furthermore, the storage 120 may store various pieces of data that may occur in the use of the AVN device 100. For example, the storage 120 may receive and store an address that corresponds to the command "my home" in advance.

Moreover, the storage 120 may store a phone book and recent call log required for providing the phone book lookup and call log lookup services to the user.

The phone book and the recent call log are sent from an external device connected to the communication unit 150 as will be described later, and synchronized with the external device. More information about the synchronization will be described later in relation to the communication unit 150.

Referring to FIG. 4, although it is shown that the controller 170 includes a Read Only Memory (ROM) 173 that stores a control program for controlling the AVN device 100, and a Random Access Memory (RAM) 172 for storing signals or data received from outside of the AVN device 100 or being used as a storage section for various tasks performed by the AVN device 100, it is also possible for the storage 120 to include such ROM and RAMs.

Furthermore, the storage 120 may be separately implemented from the controller 170 or incorporated in the controller 170 with RAMs and ROMs. In the latter case, the storage 120 may be implemented on a board or in a device by being combined with components that constitute the controller 170.

As shown in FIG. 3, the display unit 130 may be mounted in a center fascia, a center area of a dashboard 32 of the vehicle 10, and output a screen for prompting the user's manipulation or a screen for asking for the user's voice command.

Hereinafter, the screen for prompting the user's manipulation is referred to as a manipulation prompting screen and the screen for asking for the user's voice command as a voice recognition screen.

Figure 7:
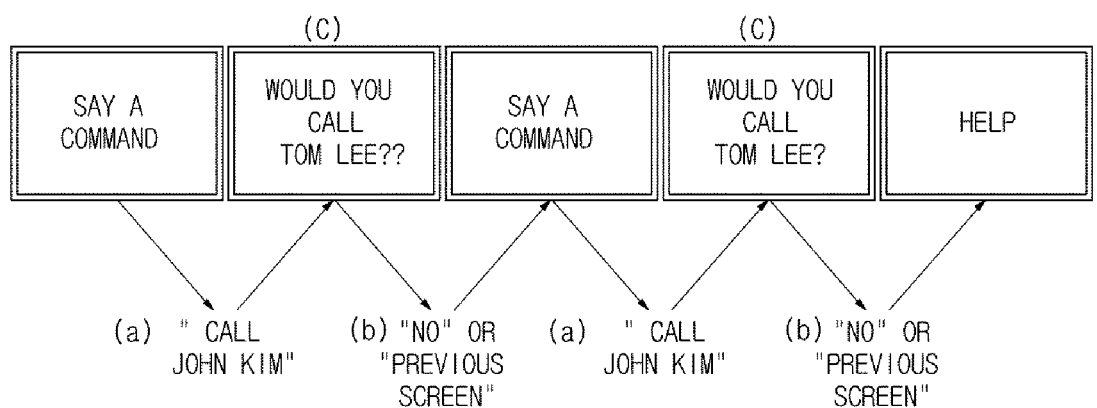
FIG. 7 shows voice recognition screens output in response to the user's voice.

FIG. 7 shows voice recognition screens output in response to the user's voice.

Referring to FIG. 7, in the voice recognition mode, the display unit 130 outputs a first voice recognition screen for receiving a voice command.

The first voice recognition screen may include, for example, a phrase like "say a command".

Next, in response to a voice command from the user, the display unit 130 outputs a second voice recognition screen. In this case, the second voice recognition screen includes a phrase that corresponds to the voice command from the user.

For example, if the voice receiver 110 has received a voice command "call John Kim", the second voice recognition screen output on the display unit 130 may include a phrase "Would you call <somebody>?" corresponding to the command "call <somebody>".

In this case, the <somebody> is a result determined by the controller 170 based on <somebody> spoken by the user, and the <somebody> included in the second voice recognition screen may or may not correspond to <somebody> spoken by the user depending on the voice recognition performance of the AVN device 100.

Accordingly, the display unit 130 may output the second voice recognition screen that includes "call John Kim" or "call Tom Lee" based on the determination of the controller 170.

Next, in response to a voice command from the user, the display unit 130 outputs a third voice recognition screen. The third voice recognition screen also includes a phrase that corresponds to the voice command from the user.

For example, if the voice receiver 110 has received a voice command "No" or "Previous screen", the third voice recognition screen output on the display unit 130 may include a phrase "say a command" corresponding to the command "No" or "Previous screen".

Next, in response to a voice command from the user, the display unit 130 outputs a fourth voice recognition screen. The fourth voice recognition screen also includes a phrase that corresponds to the voice command from the user.

For example, if the voice receiver 110 has received a voice command "call John Kim", the fourth voice recognition screen output on the display unit 130 may include a phrase "Would you call <somebody>?" corresponding to the command "call <somebody>".

In this case, the <somebody> is a result determined by the controller 170 based on <somebody> spoken by the user, and the <somebody> included in the forth voice recognition screen may or may not correspond to <somebody> spoken by the user depending on the voice recognition performance of the AVN device 100.

Accordingly, the display unit 130 may output the fourth voice recognition screen that includes "call John Kim" or "call Tom Lee" based on the determination of the controller 170.

Next, in response to a voice command from the user, the display unit 130 outputs a fifth voice recognition screen. The fifth voice recognition screen also includes a phrase that corresponds to the voice command from the user.

For example, if the voice receiver 110 has received a voice command "No" or "Previous screen", although not shown in FIG. 7, the fifth voice recognition screen output on the display unit 130 may include a phrase "say a command" corresponding to the command "No" or "Previous screen".

As such, the display unit 130 outputs different voice recognition screens depending on the user's voice command. Each voice recognition screen includes a phrase that corresponds to a voice command from the user.

However, the voice recognition screen is not limited to any of the first to fifth voice recognition screens shown in FIG. 7 and may be output in various forms.

In the meantime, the display unit 130 may output a voice recognition screen that includes Help, if the same pattern is repeated in the voice recognition mode.

Specifically, it is determined that the same pattern is repeated (i) when the number of times the same command, such as (b) of FIG. 7 has been received is equal to or greater than a threshold; (ii) when the number of times that voice recognition screens including the same phrase, such as (c) of FIG. 7 have been output is equal to or greater than a threshold; (iii) when the number of times that acoustic sounds including the same phrase have been output is equal to or greater than a threshold; (iv) when the number of times the same command has been received is equal to or greater than a threshold and when the number of times that voice recognition screens including the same phrase have been output is equal to or greater than a threshold; or (v) when the number of times the same command has been received is equal to or greater than a threshold and when the number of times that acoustic sounds including the same phrase have been output is equal to or greater than a threshold.

Referring to (b) of FIG. 7, the display unit 130 presents Help in a voice recognition screen if the command "No" or "Previous screen" has been received N times or more (N is a threshold, e.g., 2).

Referring to (c) of FIG. 7, if a voice recognition screen including the phrase "Would you call Tom Lee?" has been output N times or more (N is a threshold, e.g., 2), the display unit 130 presents Help in a voice recognition screen after a voice command is received from the user. In this case, the voice command from the user may be "No" or "Previous screen".

Referring to (a) and (c) of FIG. 7, if the command "call <somebody>" has been received N times or more (N is a threshold, e.g., 2) and a voice recognition screen including the phrase "Would you call Tom Lee?" has been output N times or more, the display unit 130 presents Help in a voice recognition screen after a voice command is received from the user. In this case, the voice command from the user may be "No" or "Previous screen".

Referring to (b) and (c), the display unit 130 may present Help on a voice recognition screen if a voice recognition screen including the phrase "Would you call Tom Lee?" has been output N times or more and the command "No" or "Previous screen" has been received N times or more.

Furthermore, if the same pattern is repeated in the voice recognition mode, the display unit 130 may output the manipulation prompting screen after the voice recognition screen including Help.

The case that the number of times acoustic sounds including the same phrase have been output is equal to or greater than a threshold will be described later in connection with the sound unit 160.

The display 130 may be implemented using a plasma display panel (PDP), light emitting diodes (LED), a liquid crystal display (LCD), or the like.

The display 130 may also be a three dimensional (3D) display for representing stereographic images.

The display unit 130 may also include a touch screen device. In this case where the display 130 includes a touch screen device, the display 130 may serve as the input unit 140 as well. The touch screen device may be implemented using a resistive touch screen panel or a capacitive touch screen panel. Alternatively, the touch screen device may be implemented using an ultrasonic or infrared touch screen panel.

Turning back to FIG. 4, the input unit 140 may allow the user to input various control commands for the AVN device 100. Specifically, the input unit 140 provides a plurality of screens for the user to input a control command while watching the screen presented on the display unit 130, the screen being an AVN screen or a voice recognition screen.

The user may manipulate various tabs rendered on the AVN screen through the input unit 140.

The input unit 140 may not exclusively include such a touch screen device, but may also include a button input or a remote control, which is separately implemented from the display unit 130.

The communication unit 150 may have e.g., a Universal Serial Bus (USB) port, bluetooth module, etc., to be connected to an external device such as a PMP, an MP3 player, a PDA, etc., for reproducing audio and video files.

Figure 8:
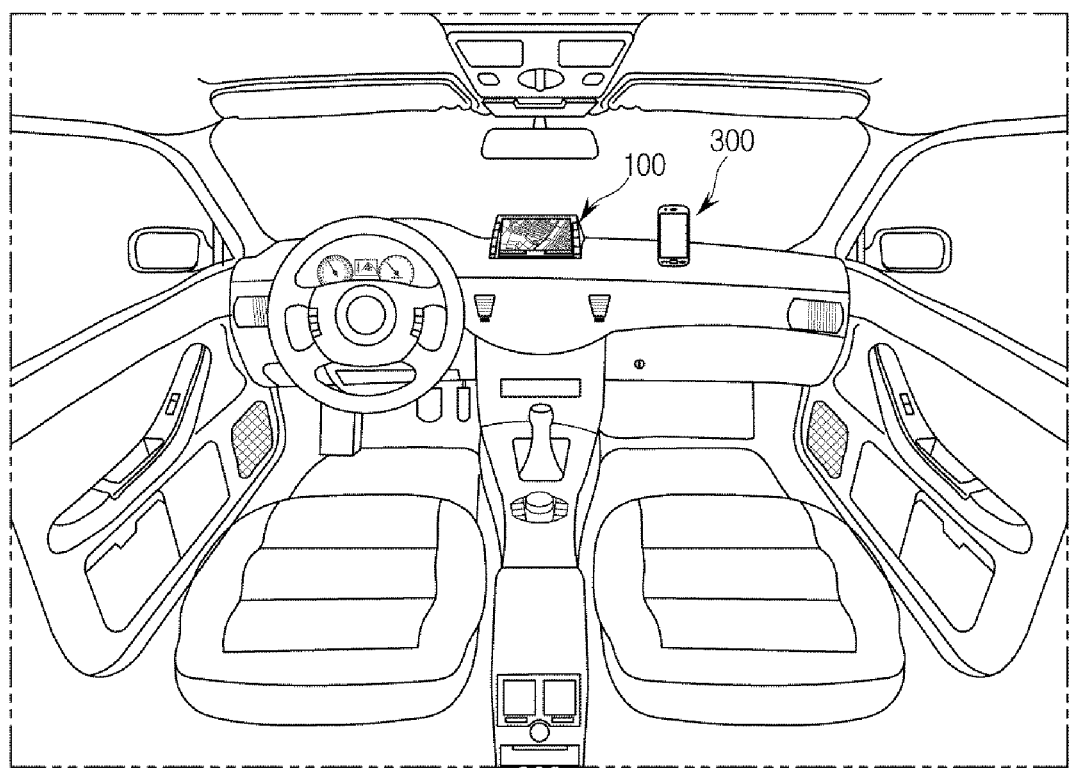
FIG. 8 shows an AVN device connected to an external device over a short-range communication network, according to an embodiment of the present disclosure.

FIG. 8 shows the AVN device 100 connected to an external device 300 over a short-range communication network, according to an embodiment of the present disclosure.

Referring to FIG. 8, the communication unit 150 may include e.g., a bluetooth module to be connected to the external device 300 over the network.

The external device 300 includes a portable terminal. The portable terminal may be a device that guarantees portability and mobility, including a Personal Communication System (PCS), a Global System for Mobile communications (GSM), a Personal Digital Cellular (PDC), a Personal Handyphone System (PHS), a Personal Digital Assistant (PDA), an International Mobile Telecommunication (IMT)-2000 device, a Code Division Multiple Access (CDMA)-2000 device, a W-CDMA device, a Wireless Broadband Internet (WiBro) terminal, a Portable Multimedia Player (PMP) terminal, a smart phone, a tablet Personal Computer (PC), a slate PC, or any other handheld based devices.

The communication unit 150 may receive a phone book and a recent call log from the external device 300. Hereinafter, a process of the communication unit 150 receiving the phone book and recent call log from the external device 300 will be referred to as "synchronization" between the AVN device 100 and the external device 300.

The synchronization between the AVN device 100 and the external device 300 may be performed at certain intervals.

With the synchronization between the AVN device 100 and the external device 300, an updated phone book and recent call log are stored in the storage 120 of the AVN device 100.

If the synchronization has yet to be performed, the phone book and recent call log included in the external device 300 may be different from those included in the storage 120 of the AVN device 100.

Through the synchronization between the AVN device 100 and the external device 300, the phone book and recent call log stored in the storage 120 correspond to those of the external device 300.

Turning back to FIG. 4, the communication unit 150 may include one of a wire communication module 151 for accessing a wired network, a wireless communication module 152 for accessing a wireless network, and a short-range communication module 153, or a combination of them.

The wire communication module 151 may include a wired Ethernet connection module, a Wide Area Network (WAN) connection module, a Value Added Network (VAN) connection module, and a Controller Area Network (CAN) connection module.

The wireless communication module 152 may access a wireless network at a location where an access point (AP) is installed, and may thus be connected to the AP. The wireless communication module 152 supports an IEEE's WLAN standard, such as IEEE 802.11x.

The short-range communication module 153 may include a bluetooth module, a bluetooth low energy module, an infrared data association (IrDA) module, a Wi-Fi module, a Ultra Wideband (UWB) and Near Field Communication (NFC) module, a Zigbee module, etc.

The sound unit 160 reproduces and outputs acoustic sounds for the user under control of the controller 170, as will be described below.

Figure 9:
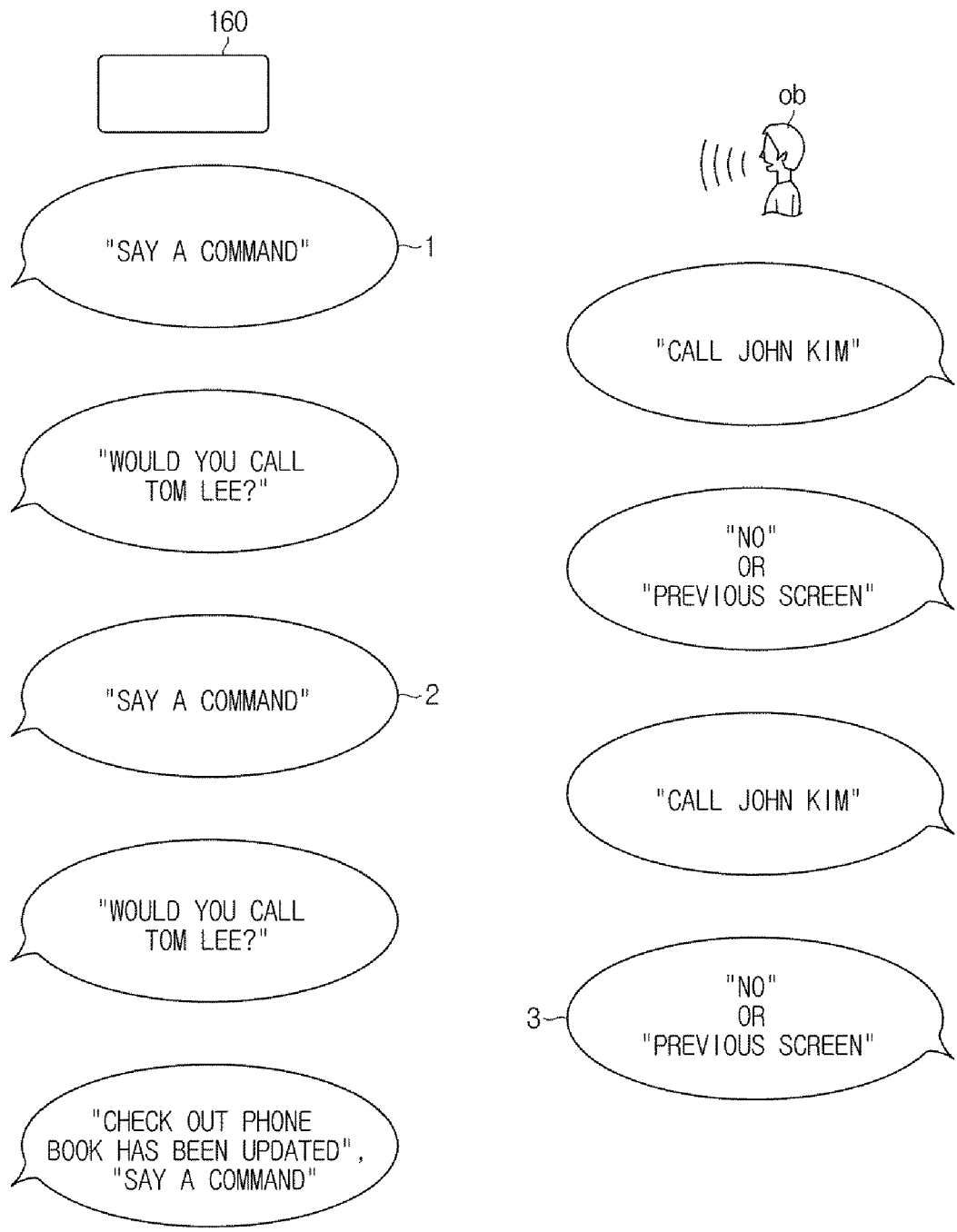
FIGS. 9 to 11 show exemplary words included in acoustic sounds output by a sound unit in a voice recognition mode.
Figure 10:
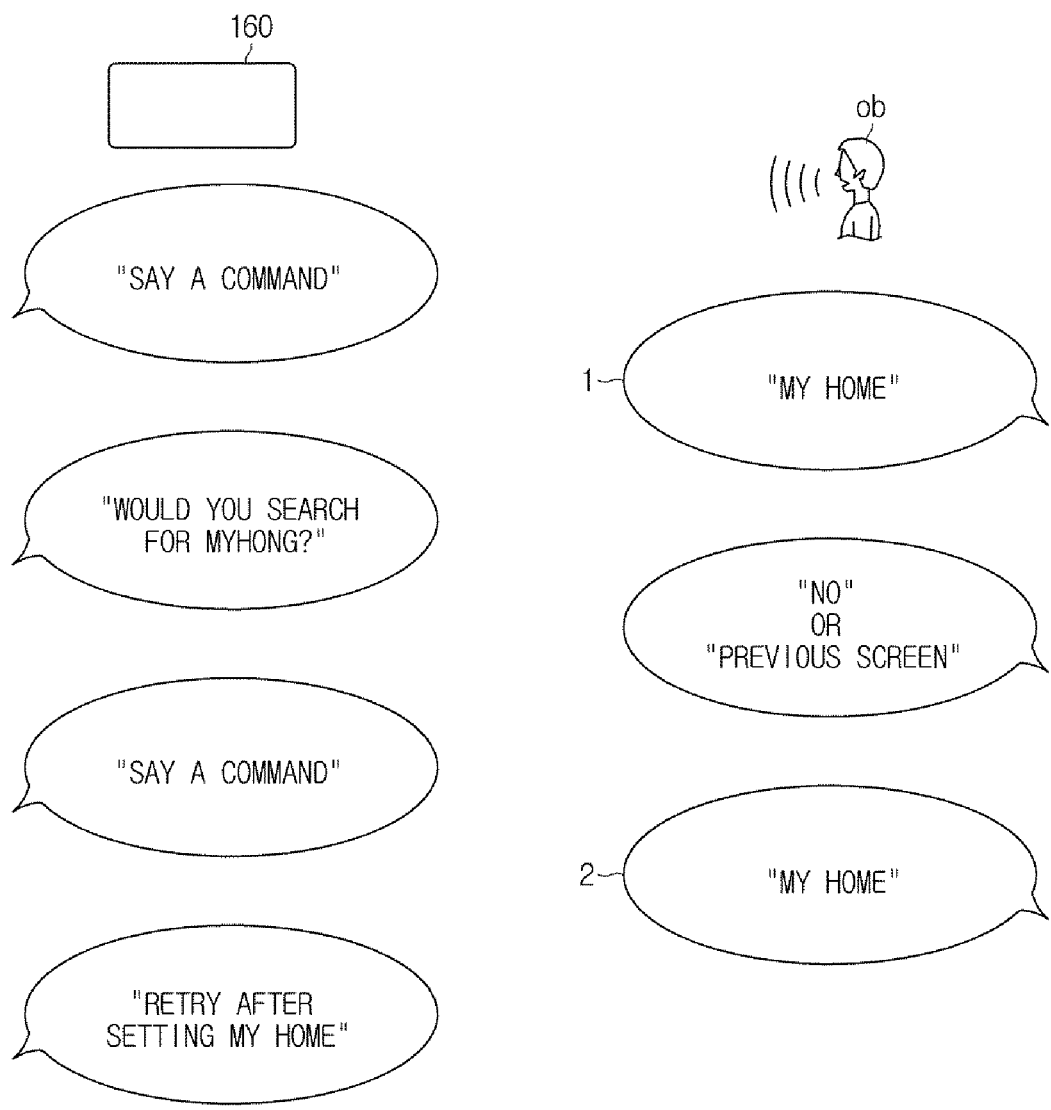
Figure 11:
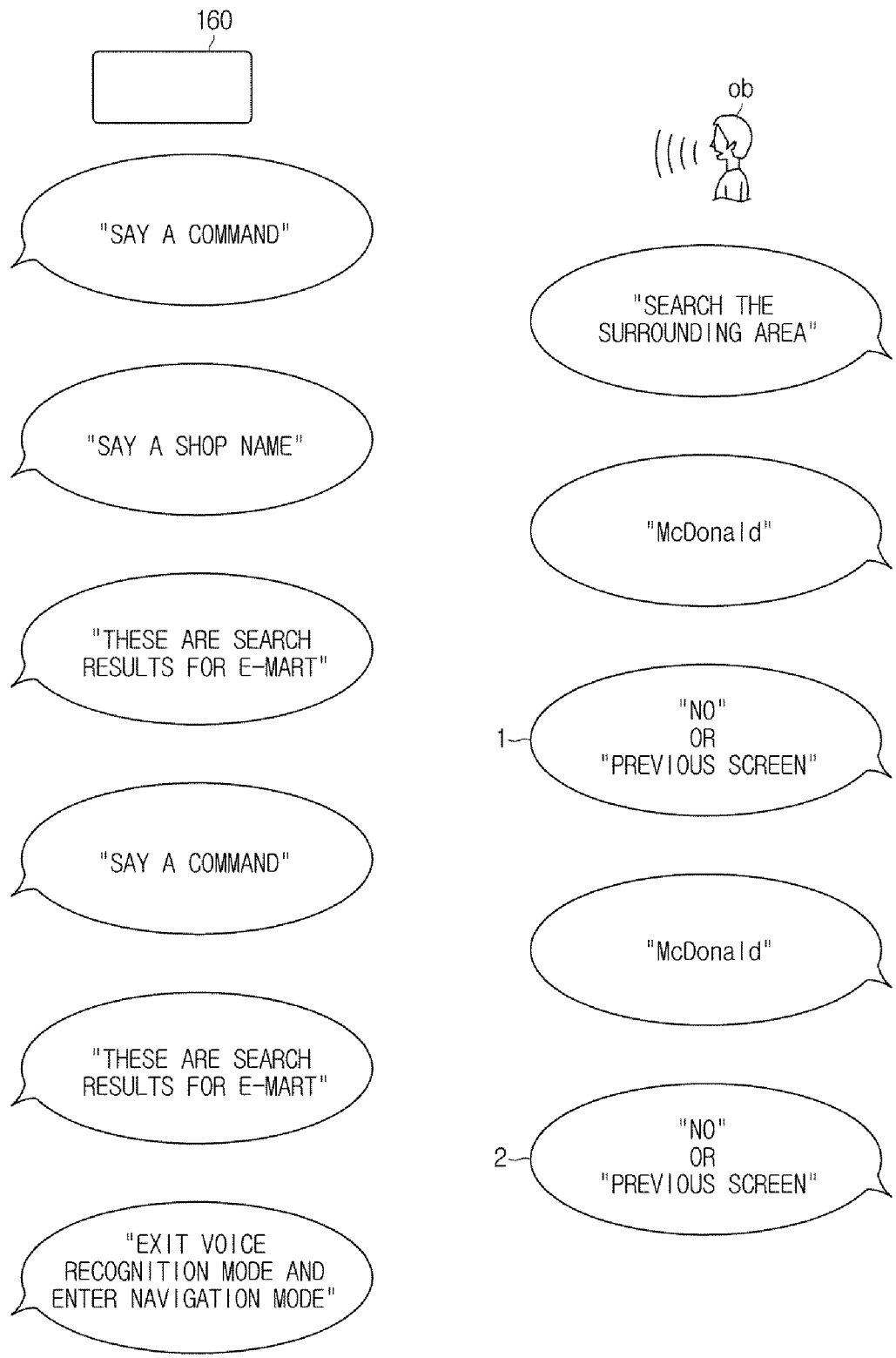

A way of outputting an acoustic sound by the sound unit 160 will now be described in connection with FIGS. 9 to 11. FIGS. 9 to 11 show exemplary words included in acoustic sounds output by the sound unit 160 in a voice recognition mode.

Referring to FIG. 9, in the voice recognition mode, the sound unit 160 outputs a first acoustic sound for receiving a voice command.

The first acoustic sound may include, for example, a phrase like "say a command".

Next, in response to a voice command from the user, the sound unit 160 outputs a second acoustic sound. In this case, the second acoustic sound includes a phrase that corresponds to the voice command from the user.

For example, if the voice receiver 110 has received a voice command "call John Kim", the second acoustic sound output by the sound unit 160 may include a phrase "Would you call <somebody>?" corresponding to the command "call <somebody>".

In this case, the <somebody> is a result determined by the controller 170 based on <somebody> spoken by the user and the <somebody> included in the second acoustic sound may or may not correspond to <somebody> spoken by the user depending on the voice recognition performance of the AVN device 100.

Accordingly, the sound unit 160 may output the second acoustic sound that includes "call John Kim" or "call Tom Lee" based on the determination of the controller 170.

Next, in response to a voice command from the user, the sound unit 160 outputs a third acoustic sound. The third acoustic sound includes a phrase that corresponds to the voice command from the user.

For example, if the voice receiver 110 has received a voice command "No" or "Previous screen", the third acoustic sound output by the sound unit 160 may include a phrase "say a command" corresponding to the command "No" or "Previous screen".

Next, in response to a voice command from the user, the sound unit 160 outputs a fourth acoustic sound. The fourth acoustic sound includes a phrase that corresponds to the voice command from the user.

For example, if the voice receiver 110 has received a voice command "call John Kim", the fourth acoustic sound output by the sound unit 160 may include a phrase "Would you call <somebody>?" corresponding to the command "call <somebody>".

In this case, the <somebody> is a result determined by the controller 170 based on <somebody> spoken by the user, and the <somebody> included in the fourth acoustic sound may or may not correspond to <somebody> spoken by the user depending on the voice recognition performance of the AVN device 100.

Accordingly, the sound unit 160 may output the fourth acoustic sound that includes "call John Kim" or "call Tom Lee" based on the determination of the controller 170.

Next, in response to a voice command from the user, the sound unit 160 outputs a fifth acoustic sound. The fifth acoustic sound includes a phrase that corresponds to the voice command from the user.

For example, if the voice receiver 110 has received a voice command "No" or "Previous screen", the fifth acoustic sound output by the sound unit 160 may include a phrase "say a command" corresponding to the command "No" or "Previous screen".

In the meantime, the sound unit 160 may output an acoustic sound that includes Help, if the same pattern is repeated in the voice recognition mode.

For example, if an acoustic sound including the phrase "Would you call Tom Lee?" has been output N times or more (N is a threshold, e.g., 2), (1 and 2 of FIG. 9), the sound unit 160 may output an acoustic sound including Help after a voice command is received from the user. In this case, an acoustic sound including help content "Check out whether the phone book has been updated" may be output if the voice command "No" or "Previous screen" 3 of FIG. 9 is received from the user.

Although not shown, the display unit 130 may output the manipulation prompting screen after the sound unit 160 outputs the acoustic sound including Help.

Alternatively, after outputting the acoustic sound including Help, the sound unit 130 may output the first acoustic sound again ("Say a command" of FIG. 9) to receive a voice command from the user.

In another embodiment as shown in FIG. 10, the sound unit 160 outputs a first acoustic sound to receive a voice command in the voice recognition mode.

The first acoustic sound may include, for example, a phrase like "Say a command".

Next, in response to a voice command from the user, the sound unit 160 outputs a second acoustic sound. In this case, the second acoustic sound includes a phrase that corresponds to the voice command from the user.

For example, if the voice command "my home" is received, the sound unit 160 may output the second acoustic sound corresponding to the voice command "my home".

In this case, the sound unit 160 may output the second acoustic sound based on determination of the controller 170.

For example, if no address corresponding to the command "my home" exists in the storage 120, the controller 170 may determine that the command corresponds to "search the surrounding area" and then the sound unit 160 may output the second acoustic sound including a phrase that corresponds to the command "search the surrounding area", such as "Would you search for 'Myhong'?" as shown in FIG. 10.

On the other hand, if an address corresponding to the command "my home" exists in the storage 120, the controller 170 may determine that the command as it is, i.e., "my home" and then the sound unit 160 may output the second acoustic sound including a phrase that corresponds to the command "my home", such as "guiding the way to my home".

Next, in response to a voice command from the user, the sound unit 160 outputs a third acoustic sound. The third acoustic sound includes a phrase that corresponds to the voice command from the user.

For example, if the voice receiver 110 has received a voice command "No" or "Previous screen", the third acoustic sound output by the sound unit 160 may include a phrase "say a command" corresponding to the command "No" or "Previous screen".

Next, in response to a voice command from the user, the sound unit 160 outputs a fourth acoustic sound. The fourth acoustic sound includes a phrase that corresponds to the voice command from the user.

For example, if the voice command "my home" is received, the sound unit 160 may output the fourth acoustic sound corresponding to the voice command "my home".

Even in this case, the sound unit 160 may output the fourth acoustic sound based on determination of the controller 170.

In the meantime, the sound unit 160 may output an acoustic sound that includes Help, if the same pattern is repeated in the voice recognition mode.

For example, with no address corresponding to the command "my home" existing in the storage 120, if the voice command "my home" has been received N times or more (N is a threshold, e.g., 2) as shown in FIG. 10 (1 and 2), an acoustic sound including Help (e.g., "Please retry after setting 'my home'") may be output.

Even in this case, although not shown, the display unit 130 may output the manipulation prompting screen after the sound unit 160 outputs the acoustic sound including Help.

Alternatively, after outputting the acoustic sound including Help, the sound unit 130 may output the first acoustic sound again ("say a command" of FIG. 9) to receive a voice command from the user.

In yet another embodiment as shown in FIG. 11, the sound unit 160 outputs a first acoustic sound to receive a voice command in the voice recognition mode.

The first acoustic sound may include, for example, a phrase like "Say a command".

Next, in response to a voice command from the user, the sound unit 160 outputs a second acoustic sound. In this case, the second acoustic sound includes a phrase that corresponds to the voice command from the user.

For example, if the voice command "search the surrounding area" is received, the sound unit 160 may output the second acoustic sound corresponding to the voice command "search the surrounding area".

For example, the second acoustic sound may include a phrase to prompt the user to say a next voice command, such as "say a shop name".

Next, in response to a voice command from the user, the sound unit 160 outputs a third acoustic sound. The third acoustic sound includes a phrase that corresponds to the voice command from the user.

For example, if the voice receiver 110 has received a voice command "McDonald", the third acoustic sound output by the sound unit 160 may include a phrase "these are search results for <shop name>" corresponding to the voice command "<shop name>".

In this case, the <shop name> is a result determined by the controller 170 based on <shop name> spoken by the user, and the <shop name> included in the third acoustic sound may or may not correspond to <shop name> spoken by the user depending on the voice recognition performance of the AVN device 100.

Accordingly, the sound unit 160 may output the third acoustic sound that includes "these are search results for McDonald" or "these are search results for E-mart" based on the determination of the controller 170.

Next, in response to a voice command from the user, the sound unit 160 outputs a fourth acoustic sound. The fourth acoustic sound includes a phrase that corresponds to the voice command from the user.

For example, if the voice receiver 110 has received a voice command "No" or "Previous screen", the fourth acoustic sound output by the sound unit 160 may include a phrase "say a command" corresponding to the command "No" or "Previous screen".

Next, in response to a voice command from the user, the sound unit 160 outputs a fifth acoustic sound. The fifth acoustic sound includes a phrase that corresponds to the voice command from the user.

For example, if the voice receiver 110 has received a voice command "McDonald", the fifth acoustic sound output by the sound unit 160 may include a phrase "these are search results for <shop name>" corresponding to the voice command "<shop name>".

Even in this case, the <shop name> is a result determined by the controller 170 based on <shop name> spoken by the user, and the <shop name> included in the fifth acoustic sound may or may not correspond to <shop name> spoken by the user depending on the voice recognition performance of the AVN device 100.

Accordingly, the sound unit 160 may output the fifth acoustic sound that includes "these are search results for McDonald" or "these are search results for E-mart" based on the determination of the controller 170.

Next, in response to a voice command from the user, the sound unit 160 outputs a sixth acoustic sound. The sixth acoustic sound includes a phrase that corresponds to the voice command from the user.

For example, if the voice command "No" or "Previous screen" is received, the sound unit 160 may output the sixth acoustic sound corresponding to the voice command "No" or "Previous screen".

In the meantime, the sound unit 160 may output an acoustic sound that includes Help, if the same pattern is repeated in the voice recognition mode.

Although not shown, the display unit 130 may output the manipulation prompting screen after the sound unit 160 outputs the acoustic sound including Help.

For example, if the voice command "No" or "Previous screen" has been received N times or more (N is a threshold, e.g., 2) as shown in FIG. 11 (1 and 2), the sound unit 160 may output an acoustic sound including Help, such as "Please exit the voice recognition mode and enter the navigation mode". Then, in the navigation mode, the display unit 130 may output the manipulation prompting screen.

As such, if the same pattern is repeated in the voice recognition mode, the AVN device 100 may output Help for the user through the display unit 130 or the sound unit 160.

However, Help in the acoustic sound is not limited to the aforementioned phrases as shown in FIGS. 9 to 11, but may be output in various forms.

Furthermore, the sound unit 160 may inform the user of whether the AVN device 100 is ready to receive a voice command.

For example, the sound unit 160 may inform the user that the AVN device 100 is ready to receive a voice command by outputting a voice recognition screen on the display unit 130 followed by a beep sound.

The sound unit 160 may be implemented as a speaker or an amplifier.

Turning back to FIG. 4, the controller 170 controls operation of the AVN device 100 according to a control program pre-stored therein or the user's input.

In an embodiment, the controller 170 activates voice recognition mode, navigation mode for providing a navigation service for the user, radio mode for providing a radio listening service, audio mode for providing an audio service, or video mode for providing a video service.

When the voice recognition mode is activated, the controller 170 determines the voice command received from the user. Based on the determination of the voice command, the controller 170 provides the user with a phrase stored in the storage 120. The phrase stored in the storage 120 may be provided in a voice recognition screen or in an acoustic sound.

For example, if it is determined that the command "call <somebody>" is received from the user, the controller 170 may provide the phrase "Would you call <somebody>?" to the user.

In this case, the voice command intended by the user may be different from that determined by the controller 170.

For example, <somebody> intended by the user may be different from <somebody> determined by the controller 170.

Furthermore, the controller 170 may determine whether the same pattern is repeated in the voice recognition mode.

Specifically, it is determined that the same pattern is repeated (i) when the number of times the same command has been received is equal to or greater than a threshold; (ii) when the number of times that voice recognition screens including the same phrase have been output is equal to or greater than a threshold; (iii) when the number of times that acoustic sounds including the same phrase have been output is equal to or greater than a threshold; (iv) when the number of times the same command has been received is equal to or greater than a threshold and when the number of times that voice recognition screens including the same phrase have been output is equal to or greater than a threshold; or (v) when the number of times the same command has been received is equal to or greater than a threshold and when the number of times that acoustic sounds including the same phrase have been output is equal to or greater than a threshold.

If it is determined that the same pattern is repeated, the controller 170 provides the user with Help stored in the storage 120 based on the determined voice command. The Help stored in the storage 120 may be provided in a voice recognition screen or in an acoustic sound.

Alternatively, if it is determined that the same pattern is repeated, the controller 170 may make a mode change based on the voice command received from the user. For example, if the same pattern is repeated and the voice command "search the surrounding area" is received from the user, the controller 170 may make a mode change to the navigation mode.

Moreover, if it is determined that the same pattern is repeated, the controller 170 may determine whether the synchronization between the AVN device 100 and the external device 300 has been performed within a predetermined period of time based on the voice command received from the user. For example, if the same pattern is repeated and the command "call <somebody>" or <Look up on <Month><Date>" is received from the user, the controller 170 may determine whether the synchronization between the AVN device 100 and the external device 300 has been performed within a week.

If the synchronization has not been performed within the predetermined period of time, the controller 170 may provide Help that informs the user that the synchronization is required.

After providing the Help for the user, the controller 170 may update the phone book and call log stored in the storage 120 by performing the synchronization between the AVN device 100 and the external device 300. The updating herein refers to receiving and storing data from the external device 300.

In addition, if the same pattern is repeated, the controller 170 may determine whether it is normally connected to a network. For example, if the voice command "synchronize" has been received twice or more, the controller 170 may determine a state of connection to the network. If it is determined that the network connection is abnormal, the controller 170 may provide Help, e.g., "Check out Bluetooth connection" to the user.

Again, the controller 170 may include the processor 171, the ROM 173 for storing a control program to control the AVN device 100, and the RAM 172 for storing signals or data input from an outside or for being used as a memory space for various tasks performed by the AVN device 100.

Alternatively, the processor 171, the RAM 172, and the ROM 173 may be incorporated on a graphic processing board (not shown) electrically separated from the controller 170.

The processor 171, ROM 172, and RAM 173 may be interconnected via an internal bus.

The term 'controller' may refer to a component that includes the processor 171, RAM 172 and ROM 173.

It may also refer to a component that includes the processor 171, RAM 172, ROM 173, and a processing board (not shown).

An embodiment of a method for controlling the AVN device 100 will now be described in connection with FIGS. 12 and 13. FIGS. 12 and 13 are flow charts illustrating a method for controlling the AVN device 100, according to embodiments of the present disclosure.

Referring to an embodiment of FIG. 12, the AVN device 100 activates the voice recognition mode according to an input from the user or a control program, in operation S1110.

The AVN device 100 outputs a voice recognition screen or an acoustic sound in operation S1120 and receives voice from the user in operation S1130. The voice may include a command.

The AVN device 100 may output a predetermined acoustic sound before receiving the voice. The predetermined acoustic sound may be a beep sound.

Next, the AVN device 100 determines if the number of times that the same command has been received is equal to or greater than a threshold, in operation S1140.

If the number of times that the same command has been received is equal to or greater than the threshold, the AVN device 100 outputs a voice recognition screen or an acoustic sound including Help, in operation 1150. The Help has phrases that correspond to one or more commands, and is stored in the AVN device 100 in advance.

After outputting the voice recognition screen or acoustic sound including the Help, the AVN device 100 may output the manipulation prompting screen, in operation S1160.

Moreover, after outputting the voice recognition screen or acoustic sound including the Help, the AVN device 100 may make a mode change in response to the user's voice or update the phone book and call log stored in the storage 120 by performing the synchronization between the AVN device 100 and an external device.

Prior to outputting the voice recognition screen or acoustic sound including the Help, the AVN device 100 may determine whether it is normally connected to a network, or whether the synchronization between the AVN device 100 and the external device has been performed.

If it is not normally connected to the network, the AVN device 100 provide Help that informs the user of the abnormal network connection state, and if the synchronization between the AVN device 100 and the external device has not been performed, the AVN device 100 may provide Help that inform the user that the synchronization is required.

If the number of times that the same command has been received is less than the threshold, the AVN device 100 outputs a subsequent voice recognition screen or a subsequent acoustic sound in response to voice of the user, in operation 1120. Operations S1130 and S1140 are repeated.

Referring to another embodiment of FIG. 13, the AVN device 100 activates the voice recognition mode according to an input from the user or a control program, in operation S1210.

The AVN device 100 outputs a voice recognition screen or an acoustic sound in operation S1220 and receives voice from the user in operation S1230. The voice may include a command.

The AVN device 100 may output a predetermined acoustic sound before receiving the voice. The predetermined acoustic sound may be a beep sound.

The AVN device 100 determines if the number of times the same voice recognition screen has been output is equal to or greater than a threshold or if the number of times the same acoustic sound has been output is equal to or greater than a threshold, in operation S1240.

If the number of times the same voice recognition screen has been output is equal to or greater than a threshold or if the number of times the same acoustic sound has been output is equal to or greater than a threshold, in operation S1240, the AVN device 100 determines if the number of times the same command has been received is equal to or greater than a threshold, in operation S1250.

If the number of times the same voice recognition screen has been output is equal to or greater than a threshold or if the number of times the same acoustic sound has been output is equal to or greater than a threshold in operation S1240, and if the number of times the same command has been received is equal to or greater than a threshold in operation S1250, the AVN device 100 outputs a voice recognition screen or acoustic sound that includes Help, in operation S1260. The Help has phrases that correspond to one or more commands, and is stored in the AVN device 100 in advance.

After outputting the voice recognition screen or acoustic sound including the Help, the AVN device 100 may output the manipulation prompting screen, in operation S1270.

Moreover, after outputting the voice recognition screen or acoustic sound including the Help, the AVN device 100 may make a mode change in response to the user's voice or update the phone book and call log stored in the storage 120 by performing the synchronization between the AVN device 100 and an external device.

Prior to outputting the voice recognition screen or acoustic sound including the Help, the AVN device 100 may determine whether it is normally connected to a network, or whether the synchronization between the AVN device 100 and the external device has been performed.

If the AVN device 100 is not normally connected to the network, the AVN device 100 may provide Help informing the user of the network connection state, and if the synchronization between the AVN device 100 and the external device has not been performed, the AVN device 100 may provide Help informing the user that the synchronization is required.

On the other hand, if the number of times the same voice recognition screen has been output is less than a threshold or if the number of times the same acoustic sound has been output is less than a threshold in operation S1240, the AVN device 100 outputs a subsequent voice recognition screen or a subsequent acoustic sound in response to a voice command of the user, in operation S1220. Operations S1230 and S1240 are repeated.

If the number of times the same voice recognition screen has been output is equal to or greater than a threshold or if the number of times the same acoustic sound has been output is equal to or greater than a threshold in operation S1240, but if the number of times the same command has been received is less than a threshold in operation S1250, the AVN device 100 outputs a subsequent voice recognition screen or subsequent acoustic sound in response to a voice command of the user in operation S1220 and repeats the operations S1230 and S1240.

In the aforementioned embodiments, some of the components of the AVN device 100 may be implemented as kind of modules. The term 'module' may refer to a software module, a Field Programmable Gate Array (FPGA), or a hardware component such as an Application Specific Integrated Circuit (ASIC), which serves a function. However, the module is not limited to software or hardware. The module may be configured to be stored in an addressable storage medium, or to execute one or more processors.

For example, the modules may include components, such as software components, object-oriented software components, class components and task components, processes, functions, attributes, procedures, subroutines, segments of program codes, drivers, firmware, microcodes, circuits, data, databases, data structures, tables, arrays, and variables. Functions served by components and modules may be combined into a less number of components and modules, or further divided into a more number of components and modules. Furthermore, the components and modules may execute one or more processors, such as Central Processing Units (CPUs) within a device.

The AVN device 100 and method for controlling the AVN device 100 may be implemented with computer-readable codes stored on a computer-readable recording medium. The computer-readable recording medium includes any type of recording medium having data stored thereon that can be thereafter read by a computer system. For example, it may be a ROM, a RAM, a magnetic tape, a magnetic disk, a flash memory, an optical data storage device, etc. The computer readable recording medium can also be distributed over network coupled computer systems so that the code is stored and executed in a distributed fashion.

According to the embodiments of the AVN device, vehicle, and method for controlling the AVN device, if the same pattern occurs several times, Help is provided for the user to quickly handle the related situation.

Several embodiments have been described, but a person of ordinary skill in the art will understand and appreciate that various modifications can be made without departing the scope of the present disclosure. Thus, it will be apparent to those ordinary skilled in the art that the disclosure is not limited to the embodiments described, which have been provided only for illustrative purposes.

What is claimed is:

1. A system comprising a portable terminal configured to make or receive a phone call and an Audio Video Navigation (AVN) device configured to be implemented in a vehicle, wherein the AVN device comprises:
   a voice receiver for receiving a command from a user in a voice recognition mode;
   a storage for storing Help application;
   a communication unit for accessing the portable terminal over a network; and
   a controller for providing the Help application for the user if a number of times a same pattern has occurred is equal to or greater than a threshold in the voice recognition mode,
   wherein the controller is configured to check whether synchronization between the AVN device and the portable terminal has been performed within a predetermined period of time, if the number of times the same pattern has occurred is equal to or greater than the threshold, and
   wherein the controller is configured to provide the Help application if a number of times a same command has been received is equal to or greater than the threshold.

2. The system of claim 1, wherein the AVN device further comprises a display unit for outputting a predetermined screen before the command is received.

3. The system of claim 2, wherein the controller is configured to provide the Help application if a number of times the predetermined screen has been output is equal to or greater than the threshold.

4. The system of claim 2, wherein the display unit outputs the Help application for the user, if the number of times the same pattern has occurred is equal to or greater than the threshold.

5. The system of claim 4, wherein the display unit outputs a manipulation prompting screen to prompt the user's manipulation after outputting the Help application.

6. The system of claim 1, wherein the AVN device further comprises a sound unit for outputting a predetermined acoustic sound before the command is received.

7. The system of claim 6, wherein the controller is configured to provide the Help application if a number of times the predetermined acoustic sound has been output is equal to or greater than the threshold.

8. The system of claim 6, wherein the sound unit outputs the Help application for the user, if the number of times the same pattern has occurred is equal to or greater than the threshold.

9. The system of claim 8, wherein the AVN device further comprises a display unit for outputting a manipulation prompting screen to prompt the user's manipulation after the sound unit outputs the Help application.

10. The system of claim 1, wherein the controller is configured to determine whether the AVN device is normally connected to the network, if the number of times the same pattern has occurred is equal to or greater than the threshold.

11. The system of claim 1, wherein the controller is configured to provide Help application informing the user that synchronization is required, if the synchronization has not been performed.

12. The system of claim 1, wherein the controller is configured to enter another mode, if the number of times the same pattern has occurred is equal to or greater than the threshold.

13. A system comprising a portable terminal configured to make or receive a phone call and a vehicle in which an Audio Video Navigation (AVN) device is implemented, wherein the vehicle comprises:
   a voice receiver for receiving a command from a user in a voice recognition mode;
   a storage for storing Help application;

a communication unit for accessing the portable terminal over a network; and a controller for providing the Help application for the user if a number of times a same pattern has occurred is equal to or greater than a threshold in the voice recognition mode, wherein the controller is configured to check whether synchronization between the vehicle and the portable terminal has been performed within a predetermined period of time, if the number of times the same pattern has occurred is equal to or greater than the threshold, and wherein the controller is configured to provide the Help application if a number of times a same command has been received is equal to or greater than the threshold.

14. A method for controlling an Audio Video Navigation (AVN) device configured to be implemented in a vehicle, the method comprising:

receiving, by a voice receiver, a command from a user in a voice recognition mode;

determining, by a controller, whether a number of times a same pattern has occurred is equal to or greater than a threshold in the voice recognition mode; and providing, by the controller, Help application for the user, whether the number of times the same pattern has occurred is equal to or greater than the threshold, wherein the determining by the controller comprises:

checking whether synchronization between the vehicle and a portable terminal configured to make or receive a phone call has been performed within a predetermined period of time, if the number of times the same pattern has occurred is equal to or greater than the threshold, and wherein the controller is configured to provide the Help application if a number of times a same command has been received is equal to or greater than the threshold.

15. The method of claim 14, wherein the determining whether the number of times the same pattern has occurred is equal to or greater than the threshold in the voice recognition mode comprises determining whether a number of times a same command has been received is equal to or greater than the threshold.

16. The method of claim 14, further comprising outputting, by a display unit, a predetermined screen before receiving the command, wherein the determining whether the number of times the same pattern has occurred is equal to or greater than the threshold in the voice recognition mode comprises determining whether the number of times the predetermined screen has been output is equal to or greater than the threshold.

17. The method of claim 14, further comprising outputting, by a sound unit, a predetermined acoustic sound before receiving the command, wherein the determining whether the number of times the same pattern has occurred is equal to or greater than the threshold in the voice recognition mode comprises determining whether the number of times the predetermined acoustic sound has been output is equal to or greater than the threshold.

18. The method of claim 14, wherein the determining whether the number of times the same pattern has occurred is equal to or greater than the threshold in the voice recognition mode comprises determining whether the AVN device is normally connected to a network.

* * * * *